3,004,070
BETA-DIKETONES

Robert J. Hartle, Gibsonia, Pa., assignor to Gulf Research & Development Company, Pittsburgh, Pa., a corporation of Delaware
No Drawing. Filed Dec. 30, 1958, Ser. No. 783,730
3 Claims. (Cl. 260—590)

This invention relates to new chemical compounds. More particularly, the invention relates to high molecular weight beta-diketones and the use thereof in hydrocarbon fuels.

The class of compounds included by the present invention are beta-diketones having the general formula:

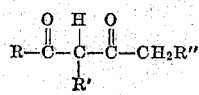

where R is an aromatic hydrocarbon group having a nuclear carbon atom thereof connected directly to the adjacent carbonyl carbon atom and containing 6 to 22 carbon atoms, such as phenyl, tolyl, xylyl, isobutylphenyl, diisobutylphenyl, or dodecylphenyl groups, and R' and R" are like or unlike open-chain, saturated or unsaturated aliphatic hydrocarbon radicals containing 8 to 22 carbon atoms, such as octyl, dodecyl, hexadecyl, octadecyl, hexadecenyl, hexadecadienyl, and the like. Beta-diketones were R is a mononuclear aromatic radial containing 6 to 12 carbon atoms, and R' and R" are alkyl groups containing 12 to 18 carbon atoms are especially advantageous. An example of a preferred beta-diketone is 1-phenyl-2-hexadecyl-1,3-eicosanedione. Examples of other beta-diketones included by the invention are 1-tolyl-2-octyl-1,3-hexadecanedione, 1-xylyl-2-decyl-1,3-tetradecanedione, 1-tolyl-2-decyl-1,3-hexadecenedione, and 1-tolyl-2-hexadecadienyl-1,3-tetradecanedione.

The beta-diketones disclosed herein can be prepared by condensation of a suitable disubstituted ketene dimer or codimer in the presence of a Friedel-Crafts catalyst, such as zinc chloride, aluminum chloride, or the like, with an equivalent proportion of a suitable aromatic hydrocarbon to provide a 1,2,3-substituted 1,3-dione, or beta-diketone. The condensation reaction is illustrated by the following equation, in which aluminum chloride is employed as the catalyst:

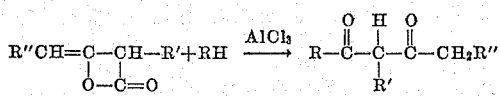

where R, R' and R" are as identified above.

The disubstituted ketene dimers or codimers from which the 1,2,3-trisubstituted 1,3-diones are obtained are prepared in conventional manner and accordingly, the preparation of these compounds as such does not constitute the essence of the present invention. In the interest of clarity, it can be briefly mentioned that the disubstituted ketene dimers or codimers are conveniently prepared by dehydrohalogenation of suitable acyl halides in the presence of a strong base, as illustrated by the following equation:

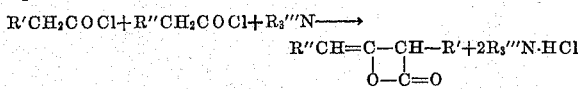

where R' and R" are as identified above, and where $R_3'''N$ is a tertiary amine.

The condensation reaction between the disubstituted ketene dimer or codimer, i.e., diketene, and the aromatic hydrocarbon can be carried out at atmospheric pressure at any temperature below the boiling point and the decomposition point of the reactants or the product thereof. Excellent results have been obtained by the use of temperatures in the range of about 30° to about 60° C. However, other temperatures can be used. For example, temperatures as low as 0° C. can be employed where an accompanying reduction in the rate of reaction is not important. Temperatures greater than 100° C. are rarely required. Temperatures in the upper portion of the range are normally less preferred, unless necessary to promote the reaction, since higher temperatures tend to favor side reactions and also may necessitate the use of a closed system to retain the reactants.

Ketene dimers or codimers that can be employed to form the polyvalent metal beta-diketone chelates of this invention are diketenes of the general formula:

where R' and R" are like or unlike open-chain aliphatic hydrocarbon radicals of the class disclosed above. These hydrocarbon radicals can be saturated or unsaturated straight or branched chain groups such as n-octyl, isooctyl, isoundecyl, n-dodecyl, n-hexadecyl, octadecenyl or octadecadienyl, and the like, and these groups themselves can be further substituted with nonhydrocarbon substituents, such as chlorine, bromine, hydroxyl, and the like, that do not interfere with the condensation reaction or chelate formation and that do not adversely affect the combustion improvement properties of the polyvalent metal chelates derived from the diketenes. An example of a preferred diketene is hexadecyl ketene dimer. Examples of other diketenes that can be used to prepare the polyvalent metal chelates of this invention are decyl ketene dimer, isoundecyl ketene dimer, lauryl ketene dimer, hexadecenyl ketene dimer, hexadecadienyl ketene dimer, decyl, hexadecyl ketene codimer, and the like.

An example of a preferred hydrocarbon with which the diketene can be condensed in accordance with the present invention is benzene. Examples of other mononuclear aromatic hydrocarbons that can be used are toluene, xylene, and dodecylbenzene. An example of a polynuclear hydrocarbon is naphthalene. The aromatic hydrocarbons employed in the condensation can be substituted, if desired, with nonhydrocarbon substituents that do not interfere with the condensation reaction, and that do not adversely affect the combustion improving properties of the ultimate derivatives.

Example 1

In accordance with a preferred embodiment of the invention, a solution of 356 grams (0.67 mol) of n-hexadecyl ketene dimer (Aquapel 364) in 500 cc. of C.P. benzene is added dropwise to a rapidly stirred suspension of 197.3 grams (1.5 mols) of anhydrous aluminum chloride in 800 cc. of C.P. benzene. The reaction temperature is maintained at 35–40° C. by controlling the rate of addition. About 2.5 hours are required for complete addition of the ketene dimer. The mixture is allowed to stand at room temperature for about 18 hours and then heated with stirring at 60° C. for three hours. After cooling, the reaction mixture is poured over crushed ice. The mixture is then allowed to melt and then heated to boiling with rapid stirring. Hydrochloric acid (1:1 by volume water and concentrated HCl) is added slowly during this time. Boiling and addition of hydrochloric acid (500 cc.) are continued until the mixture is clear. The organic phase is removed, diluted with an equal volume of benzene, and washed with hot water until the wash water is neutral. The benzene solution is then dried over anhydrous sodium sulfate. Solvent is removed by evaporation at reduced pressure. A product prepared in accordance with the above-indicated procedure, consisting chiefly of 1-phenyl-2-hexadecyl-1,3-eicosanedione, was a yellow-green fluorescent liquid which solidified after standing overnight at room temperature. The enolizable diketone content of this product, calculated as $C_{42}H_{74}O_2$, was found to be 80 percent by titration with alcoholic potassium hydroxide in benzene-ethanol solution. A crude yield of about 94 percent was obtained.

The foregoing example is illustrative only and other beta-diketones included by this invention can be similarly prepared by the substitution of equivalent amounts of other suitable ketene dimers and other aromatic or olefinic hydrocarbons in the foregoing examples. For example, there can be prepared by appropriate substitution in the foregoing example: 1-tolyl-2-octyl-1,3-hexadecanedione, 1-xylyl-2-decyl-1,3-tetradecanedione, 1-tolyl-2-decyl-1,3-hexadecenedione, and 1-tolyl-2-hexadecadienyl-1,3-tetradecanedione.

The beta-diketones disclosed herein are useful as intermediates in preparing exceptionally stable polyvalent metal chelate derivatives, which in turn are especially effective, in proportions of 0.001 to 0.5 percent by weight, to improve the combustion characteristics of hydrocarbon fuel oils. The polyvalent metal chelates prepared from the hereindisclosed beta-diketones are exceptionally resistant to decomposition by water, as well as by acids and bases. Resistance to decomposition by water is important as hydrocarbon fuel oils normally contain or are contacted by significant proportions of water or condensed moisture, and the decomposition products of the polyvalent metal chelates are substantially less effective combustion improvement agents than polyvalent metal chelates.

The nature of the hydrocarbon substituents of the beta-diketones disclosed herein is important as regards the stability of the polyvalent metal chelate derivatives. Apparently, the three bulky substituents of the beta-diketones coact to shield, or sterically hinder, the polyvalent metal from exposure to water, as lower molecular weight beta-diketones do not form polyvalent metal chelates that are stable to water.

By way of illustrating the unusual stability of the polyvalent metal chelates derived from the beta-diketones disclosed herein, a solution of 25 grams of a crude beta-diketone product prepared as described above in a mixture of 100 cc. of benzene and 100 cc. of ethanol was neutralized with 1 N alcoholic sodium hydroxide solution. The resulting sodium chelate solution was treated with 3.0 grams of ferric chloride hexahydrate, dissolved in a minimum of water. Water in the amount of 300 cc. was then added to the mixture. A deep red organic phase, indicating the presence of iron, was drawn off from an essentially clear aqueous phase. When the experiment was carried out with acetyl-acetone, a low molecular weight beta-diketone, the red color was essentially all in the aqueous phase, indicating that no iron remained in chelate form in the organic phase.

Aside from their use as intermediates in the synthesis of exceptionally stable polyvalent metal chelates, the beta-diketones disclosed herein are themselves capable of improving the combustion characteristics of hydrocarbon fuel oils. For example, 0.06 percent by weight of 1-phenyl-2-hexadecyl-1,3-eicosanedione was found to produce greater than 20 percent reduction in the smoke and soot forming tendencies of a distillate fuel oil. They are also useful as such in reducing the preheater deposit-forming and filter-plugging tendencies of jet fuels. They are also considered to posses detergent characteristics when used in small proportions in gasoline motor fuels and hydrocarbon oil lubricants. Also, the beta-diketones disclosed herein are also considered to possess engine antistalling properties, antirust properties and metal deactivating properties in gasolines.

Obviously, many modifications and variations of the invention as herein described may be resorted to without departing from the spirit or scope thereof. Therefore, only such limitations should be imposed as are indicated in the appended claims.

I claim:
1. A beta-diketone having the general formula:

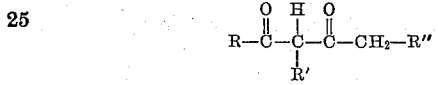

where R is a member selected from the group consisting of naphthyl and mononuclear aromatic hydrocarbon radicals having a nuclear carbon atom thereof connected directly to the adjacent carbonyl carbon atom and containing 6 to 22 carbon atoms, and R' and R" are members selected from the group consisting of saturated and mono- and di-olefinic open-chain aliphatic hydrocarbon radicals that contain 8 to 22 carbon atoms.

2. A beta-diketone having the general formula:

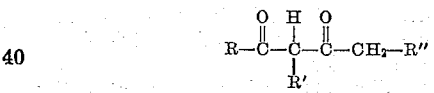

where R is a mononuclear aromatic hydrocarbon radical containing 6 to 12 carbon atoms and R' and R" are alkyl groups containing 12 to 18 carbon atoms.

3. 1-phenyl-2-hexadecyl-1,3-eicosanedione.

References Cited in the file of this patent

UNITED STATES PATENTS 2,864,850    Westfahl _____ Dec. 16, 1958

OTHER REFERENCES

Wiemann et al.: Compt. rend., volume 238, pages 699–700 (1954).